(12) United States Patent
Lu et al.

(10) Patent No.: US 12,518,349 B2
(45) Date of Patent: Jan. 6, 2026

(54) MULTI-SCALE DETAIL ENHANCEMENT MODEL FOR IMAGES

(71) Applicant: BOE Technology Group Co., Ltd., Beijing (CN)

(72) Inventors: Yunhua Lu, Beijing (CN); Guannan Chen, Beijing (CN); Pablo Navarrete Michelini, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 182 days.

(21) Appl. No.: 18/283,007

(22) PCT Filed: Jan. 3, 2023

(86) PCT No.: PCT/CN2023/070055
§ 371 (c)(1),
(2) Date: Sep. 20, 2023

(87) PCT Pub. No.: WO2023/142904
PCT Pub. Date: Aug. 3, 2023

(65) Prior Publication Data
US 2024/0177271 A1 May 30, 2024

(30) Foreign Application Priority Data
Jan. 30, 2022 (CN) .......................... 202210115313.6

(51) Int. Cl.
*G06T 5/50* (2006.01)
*G06T 7/13* (2017.01)
(Continued)

(52) U.S. Cl.
CPC .................. *G06T 5/50* (2013.01); *G06T 7/13* (2017.01); *G06V 10/44* (2022.01); *G06V 10/771* (2022.01);
(Continued)

(58) Field of Classification Search
None
See application file for complete search history.

(56) References Cited

U.S. PATENT DOCUMENTS

2016/0292824 A1* 10/2016 Li .............................. G06T 3/20
2021/0166360 A1*  6/2021 Kim .......................... G06T 5/60
(Continued)

FOREIGN PATENT DOCUMENTS

| CN | 102890817 A |   | 1/2013 |             |
|----|-------------|---|--------|-------------|
| CN | 112270646 A | * | 1/2021 | ............. G06N 3/045 |

(Continued)

OTHER PUBLICATIONS

Talebi H, Milanfar P. Fast multilayer Laplacian enhancement. IEEE Transactions on Computational Imaging. Sep. 8, 2016;2(4):496-509. (Year: 2016).*

(Continued)

*Primary Examiner* — Zhengxi Liu
(74) *Attorney, Agent, or Firm* — Ling Wu; Stephen Yang; Ling and Yang Intellectual Property

(57) ABSTRACT

An image processing method, comprising: by using a trained multi-scale detail enhancement model, performing detail enhancement on an input image to be processed; wherein multi-scale decomposition is performed on the input image to obtain a base layer image and at least one detail layer image; a first residual feature corresponding to a first feature map is acquired, and a second residual feature corresponding to a second feature map of each detail layer image is acquired; a base layer output image is obtained according to the first residual feature, each second residual feature and the first feature map, and a detail layer output image corresponding to the detail layer image is obtained according to the first residual feature, each second residual feature and the second feature map; and image fusion is performed on the base layer (Continued)

output image and each detail layer output image to obtain an output image.

12 Claims, 8 Drawing Sheets

(51) Int. Cl.
  *G06V 10/44* (2022.01)
  *G06V 10/771* (2022.01)
  *G06V 10/80* (2022.01)
(52) U.S. Cl.
  CPC .. *G06V 10/806* (2022.01); *G06T 2207/20192* (2013.01); *G06T 2207/20221* (2013.01)

(56) References Cited

U.S. PATENT DOCUMENTS

| 2022/0067890 A1* | 3/2022 | Zhang | G06T 9/002 |
| 2023/0025557 A1* | 1/2023 | Wang | G06T 5/60 |

FOREIGN PATENT DOCUMENTS

| CN | 113034413 A | 6/2021 |
| CN | 113313644 A | 8/2021 |
| CN | 114429430 A | 5/2022 |

OTHER PUBLICATIONS

Yeh CH, Huang CH, Kang LW. Multi-scale deep residual learning-based single image haze removal via image decomposition. IEEE Transactions on Image Processing. Dec. 11, 2019;29:3153-67. (Year: 2019).*

Zhou Y, Du X, Wang M, Huo S, Zhang Y, Kung SY. Cross-scale residual network: A general framework for image super-resolution, denoising, and deblocking. IEEE Transactions on Cybernetics. Feb. 2, 2021;52(7):5855-67. (Year: 2021).*

International Search Report for PCT/CN2023/070055 Mailed Mar. 22, 2023.

Wang et al., "An improved infrared image adaptive enhancement method", Infrared and Laser Engineering, vol. 50 No. 11, Nov. 2021, DOI: 10.3788/IRLA20210086.

Zeev Farbman et al., "Edge-Preserving Decompositions for Multi-Scale Tone and Detail Manipulation", ACM Transactions on Graphics, Aug. 2008, DOI: 10.1145/1360612.1360666.

Wang et al., "Multimodal MedicalImage Fusion Basedon Dual Residual Hyper Densely Networks", Computer Science, vol. 48, No. 2, Feb. 2021, pp. 160-166, DOI:10.11896/jsjkx. 200400095.

Liu et al., "Real-time Image Smoothing via Iterative Least Squares", ACM Trans. Graph. 39, 3, Article 28 (Jun. 2020), 24 pages.

T. Isobe et al., "Video Super-Resolution with Recurrent Structure-Detail Network".

* cited by examiner

MULTI-SCALE DETAIL ENHANCEMENT MODEL FOR IMAGES

CROSS-REFERENCE TO RELATED APPLICATIONS

The present application is a U.S. National Phase Entry of International PCT Application No. PCT/CN2023/070055 having an international filing date of Jan. 3, 2023, which claims priority to Chinese Patent Application No. 202210115313.6 filed on Jan. 30, 2022. The above-identified applications are incorporated by reference herein in their entireties.

TECHNICAL FIELD

The present disclosure relates to a technical field of image processing, in particular to an image processing method, an electronic device and a non-transient computer readable medium.

BACKGROUND

The existing image enhancement and detail enhancement algorithms based on neural network model have achieved good results and are widely used in various image processing. However, the current neural network model has low processing fineness and poor flexibility, and is easily affected by image noise in some scenes.

SUMMARY

The present disclosure aims to solve at least one of the technical problems existing in the prior art, and provides an image processing method, an electronic device and a non-transient computer readable medium.

To achieve the above object, in a first aspect, an embodiment of the present disclosure provides an image processing method, including:
  by using a trained multi-scale detail enhancement model, performing detail enhancement on an input image to be processed to obtain an output image;
  wherein the multi-scale detail enhancement model is configured to perform the following acts:
  performing a multi-scale decomposition on the input image to obtain a base layer image and at least one detail layer image of the input image;
  acquiring a first feature map of the base layer image and acquiring a second feature map of each of the detail layer images;
  acquiring a first residual feature corresponding to the first feature map, and acquiring a second residual feature corresponding to the second feature map of each of the detail layer images; obtaining a base layer output image according to the first residual feature, each of the second residual features and the first feature map, and for each of the detail layer images, obtaining a detail layer output image corresponding to the detail layer image according to the first residual feature, each of the second residual features and the second feature map of the detail layer image; and
  performing an image fusion on the base layer output image and each of the detail layer output images to obtain the output image.

In some embodiments, acquiring a first residual feature corresponding to the first feature map and acquiring a second residual feature corresponding to the second feature map of each of the detail layer images includes:
  acquiring the first residual feature and each of the second residual features through P stage operation blocks which are connected sequentially, wherein P is a positive integer;
  wherein, for the first stage operation block, taking the first feature map and each of the second feature maps as inputs, extracting a residual feature of the first feature map and a residual feature of each of the second feature maps, superimposing the residual feature of the first feature map and the residual feature of each of the second feature maps to obtain a multi-scale residual feature corresponding to the first stage operation block;
  for the m-th stage operation block, wherein m is a positive integer greater than 1 and m is not greater than P: taking a first intermediate feature map and each second intermediate feature map outputted by the (m−1)-th stage operation block as inputs, extracting a residual feature of the first intermediate feature map and a residual feature of each of the second intermediate feature maps, superimposing the residual feature of the first intermediate feature map and the residual feature of each of the second intermediate feature maps to obtain the multi-scale residual feature corresponding to the m-th stage operation block;
  obtaining a base layer output image according to the first residual feature, each of the second residual features and the first feature map, and for each of the detail layer images, obtaining a detail layer output image corresponding to the detail layer image according to the first residual feature, each of the second residual feature and the second feature map of the detail layer image, includes:
  obtaining the base layer output image according to the multi-scale residual feature obtained by each of the P stage operation blocks which are connected sequentially and the first feature map, and obtaining the detail layer output image corresponding to each of the detail layer images according to the multi-scale residual feature obtained by each of the P stage operation blocks which are connected sequentially and the second feature map of each of the detail layer images;
  wherein, for the first stage operation block, superimposing the multi-scale residual feature corresponding to the first stage operation block and the first feature map to obtain and output the first intermediate feature map of the first stage operation block, and superimposing the multi-scale residual feature corresponding to the first stage operation block and each of the second feature maps, respectively, to obtain and output each of the second intermediate feature maps of the first stage operation block;
  for the m-th stage operation block, superimposing the multi-scale residual feature corresponding to the m-th stage operation block and the first intermediate feature map outputted by the (m−1)-th stage operation block to obtain and output the first intermediate feature map of the m-th stage operation block, and superimposing the multi-scale residual feature corresponding to the m-th stage operation block and each of the second intermediate feature maps outputted by the (m−1)-th stage operation block, respectively, to obtain and output each of the second intermediate feature maps of the m-th stage operation block; and
  obtaining the base layer output image according to the first intermediate feature map outputted by the P-th stage operation block, and obtaining the detail layer output image corresponding to each of the detail layer images according to each of the second intermediate feature maps outputted by the P-th stage operation block, respectively.

In some embodiments, each stage operation block includes a first operation unit and at least one second operation unit, wherein the first operation unit and the second operation unit each includes at least two convolution layers;

wherein, for the first stage operation block: the residual feature of the first feature map is extracted by using the first operation unit of the first stage operation block, and the residual feature of each of the second feature maps is extracted by using the second operation unit of the first stage operation block; and for the m-th stage operation block, the residual feature of the first intermediate feature map outputted by the (m−1)-th stage operation block is extracted by using the first operation unit of the m-th stage operation block, and the residual feature of each of the second intermediate feature map outputted by the (m−1)th stage operation block is extracted by using the second operation unit of the m-th stage operation block.

In some embodiments, the first operation unit and the second operation unit each include a first convolution layer, a normalization layer, an activation layer, and a second convolution layer which are connected sequentially.

In some embodiments, the normalization layer is a half instance normalization layer.

In some embodiments, P is greater than or equal to 2.

In some embodiments, the multi-scale detail enhancement model is trained by the following acts:

acquiring a first image sample and a second image sample corresponding to the first image sample, and performing the detail enhancement on the second image sample;

Inputting the first image sample and the enhanced second image sample into the multi-scale detail enhancement model to be trained;

training the multi-scale detail enhancement model to be trained based on the first image sample and the enhanced second image sample in an iteration manner; and ending the training to obtain the multi-scale detail enhancement model in response to the preset convergence condition being satisfied.

In some embodiments, the preset convergence condition includes at least one of the following:

having trained for the preset quantity of iterations; or a loss value satisfying a preset loss value condition, wherein the loss value is calculated based on the enhanced second image sample and the first image sample processed by the multi-scale detail enhancement model.

In some embodiments, the first image sample and the second image sample are noise images and noise-free images corresponding to the same image sample, respectively.

In some embodiments, performing the multi-scale decomposition on the input image to obtain the base layer image and at least one detail layer image of the input image, includes:

performing an iterative filtering processing for n times on the input image, wherein n is a positive integer;

wherein the n-th filtering result is taken as the base layer image; and for the i-th filtering result, wherein i is a positive integer and i is not greater than n: taking a difference between the i-th filtering result and the input image as the detail layer image, or taking a difference between the i-th filtering result and the (i−1)-th filtering result as the detail layer image.

In some embodiments, performing an iterative filtering processing for n times on the input image includes:

performing an iterative filtering processing for n times on the input image by using a edge preserving filtering operator.

In some embodiments, n is greater than or equal to 2.

In a second aspect, an embodiment of the present disclosure also provides an electronic device, including:

one or more processors;

a memory for storing one or more programs; and when the one or more programs are executed by the one or more processors, the one or more processors are caused to implement the image processing method as described in any of the above embodiments.

In a third aspect, an embodiment of the present disclosure also provides a non-transient computer-readable medium having a computer program stored thereon, wherein the program, when executed, implements the image processing method as described in any of the above embodiments.

BRIEF DESCRIPTION OF DRAWINGS

The attached drawings are used to provide a further understanding the present disclosure, and constitute a part of the specification. They are used together with the embodiments of the present application to explain the present disclosure, and do not constitute a restriction on the present disclosure. The above and other features and advantages will become more apparent to those skilled in the art by describing detailed example embodiments with reference to the accompanying drawings, in which.

DETAILED DESCRIPTION

To enable those skilled in the art to better understand the technical scheme of the present disclosure, the image processing methods, the electronic devices, and the non-transient computer readable media provided by the present disclosure are described in detail below in conjunction with the accompanying drawings.

Example embodiments will be described more fully hereinafter with reference to the accompany drawings, but the described example embodiments may be embodied in different forms and should not be construed as limited to the embodiments set forth herein. On the contrary, these examples are provided for the purpose of making the present disclosure thorough and complete, and will enable those skilled in the art to fully understand the scope of the present disclosure.

Terms used herein are only used to describe specific embodiments and are not intended to limit the present disclosure. As used herein, the singular forms "a" and "the" are also intended to include the plural forms, unless the context clearly indicates otherwise. It will also be understood that, when used in the present specification, the terms "including" and/or "made of" specify the presence of stated features, integers, acts, operations, elements and/or components, but do not exclude the presence or addition of one or more other features, integers, acts, operations, elements, components and/or groups thereof.

It will be understood that, although the terms first, second, etc., may be used herein to describe various elements, these elements should not be limited by these terms. These terms are used only to distinguish one element from another. Thus the first element, the first element or the first module discussed below may be referred to as a second element, a second element or a second module without departing from the teachings of the present disclosure.

Unless otherwise defined, all terms (including technical and scientific terms) used in the present disclosure have the same meanings as those commonly understood by those of ordinary skill in the art. It will also be understood that terms such as those defined in commonly used dictionaries should be interpreted as having meanings consistent with their meanings in the context of the related art and the present disclosure, and will not be interpreted as having idealized or excessive formal meanings unless the present disclosure explicitly defines so.

Figure 1:
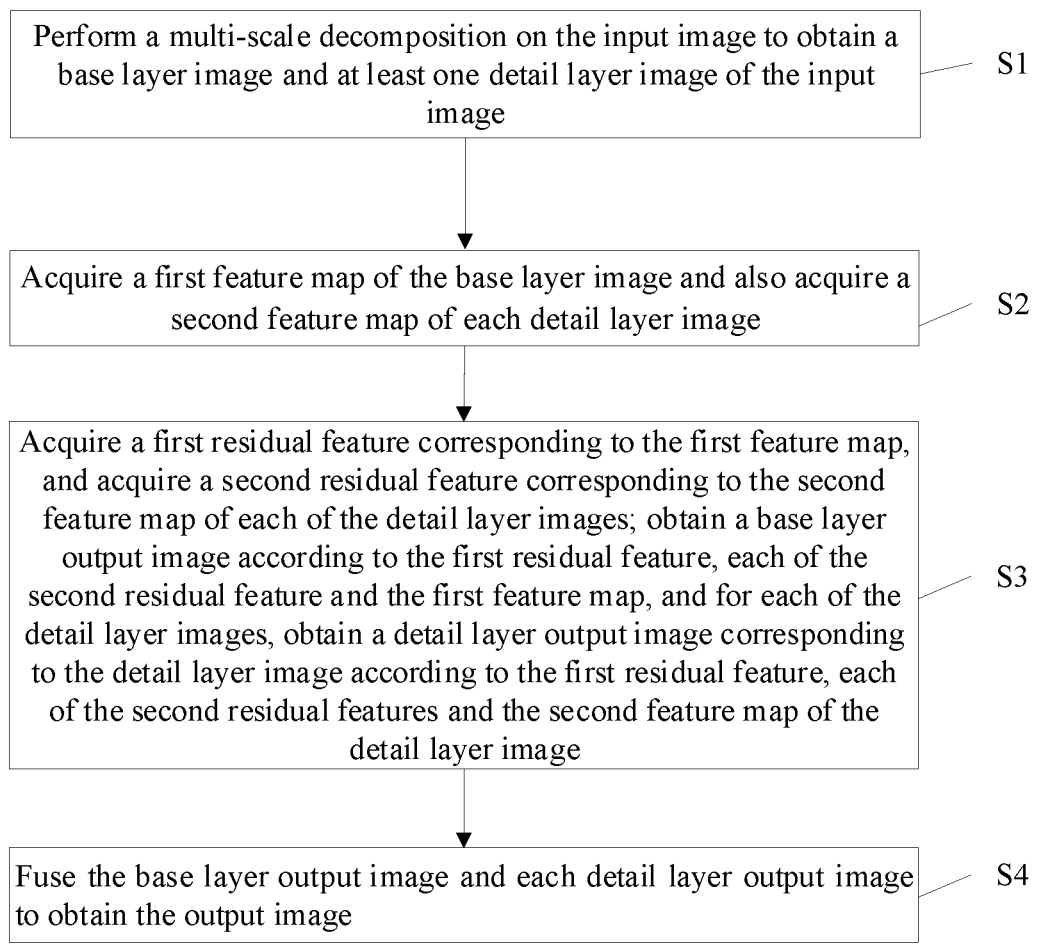
FIG. 1 is a flowchart of a method for processing an image according to an embodiment of the present disclosure.

FIG. 1 is a flowchart of a method for processing an image according to an embodiment of the present disclosure. Specifically, in the method, the detail enhancement is performed on the input image to be processed by using a trained multi-scale detail enhancement model to obtain an output image; and as shown in FIG. 1, the multi-scale detail enhancement model is configured to perform the following acts.

At act S1, a multi-scale decomposition is performed on the input image to obtain a base layer image and at least one detail layer image of the input image.

Herein, the multi-scale decomposition may also be called Multi-Scale Image Decomposition, and in the act S1, the multi-scale decomposition is performed on the input image to obtain a base layer image with a larger scale and a detail layer image with a smaller scale; in some embodiments, a multi-scale decomposition is performed on the input image by a preset filtering algorithm to obtain a base layer image and at least one detail layer image, wherein the base layer image is the result of filtering the input image at a larger filtering scale and is the basic information of the image, and the detail layer image carries the image detail information extracted when the input image is filtered at each filtering scale.

In some embodiments, the scale of the image is related to the blur degree of the image. Taking human eye perception as an example, the blur degree corresponding to when human eyes watch an object at close range is different from that corresponding to when they watch an object at a long distance. Accordingly, the larger the scale of the image, the more blurred it will be and the detail information will be lost.

At Act S2, a first feature map of the base layer image is acquired, and a second feature map of each detail layer image is also acquired.

Herein, image features of the base layer image are extracted to obtain the first feature map, and image features of the detail layer image are extracted to obtain the second feature map.

In some embodiments, the first feature map of the base layer image and the second feature map of each detail layer image are extracted and obtained by using a convolution layer.

At Act S3, a first residual feature corresponding to the first feature map is acquired, and a second residual feature corresponding to the second feature map of each of the detail layer images is acquired; a base layer output image is obtained according to the first residual features, each of the second residual features and the first feature map, and for each of the detail layer images, a detail layer output image corresponding to the detail layer image is obtained according to the first residual feature, each of the second residual features and the second feature map of the detail layer image.

Herein, based on the first feature map of the base layer image and the second feature map of each detail layer image, the base layer output image and the detail layer output image are obtained by combining their respective corresponding residual features, and the base layer output image and the detail layer output image are the base layer image and the detail layer image after the detail enhancement performed by the multi-scale detail enhancement model.

At act S4, the image fusion is performed on the output image of the base layer and the output image of each detail layer to obtain the output image.

Herein, the output image is an input image after the detail enhancement performed by the multi-scale detail enhancement model; the process of image fusion of the base layer output image and each of the detail layer output images is a process of obtaining the output image after fusing the basic information and the detail information of the input image performed by the image enhancement.

An embodiment of the present disclosure provides an image processing method, which may be used for performing detail enhancement on an input image to be processed by using a multi-scale detail enhancement model, wherein a multi-scale image decomposition on the input image is performed to obtain a base layer image and at least one detail layer image; a first feature map of the base layer image is acquired and a second feature map of each detail layer image is acquired; a first residual feature corresponding to a first feature map is acquired, and a second residual feature corresponding to each second feature map is acquired; a base layer output image is obtained according to the first residual feature, each second residual feature and the first feature map, and a detail layer output image is obtained according to the first residual feature, each second residual feature and the second feature map; and the image fusion is performed on the base layer output image and each of the detail layer output image to obtain an output image. Therefore, edge information enhancement and detail information enhancement based on multiple dimensions may be achieved, and the better image overall enhancement effect may be obtained compared with the related technology. Moreover, in the related technology, for the images containing noise, the linear or nonlinear mapping equation is directly used to perform a detail operation, which may amplify the image noise while the detail enhancement is achieved, whereas by using a method of performing a multi-scale image decomposition, and detail enhancement by combining the residual features of the multi-scale image in an embodiment of the present disclosure, the noise may be suppressed while the detail enhancement is achieved through the corresponding training process.

Figure 2:
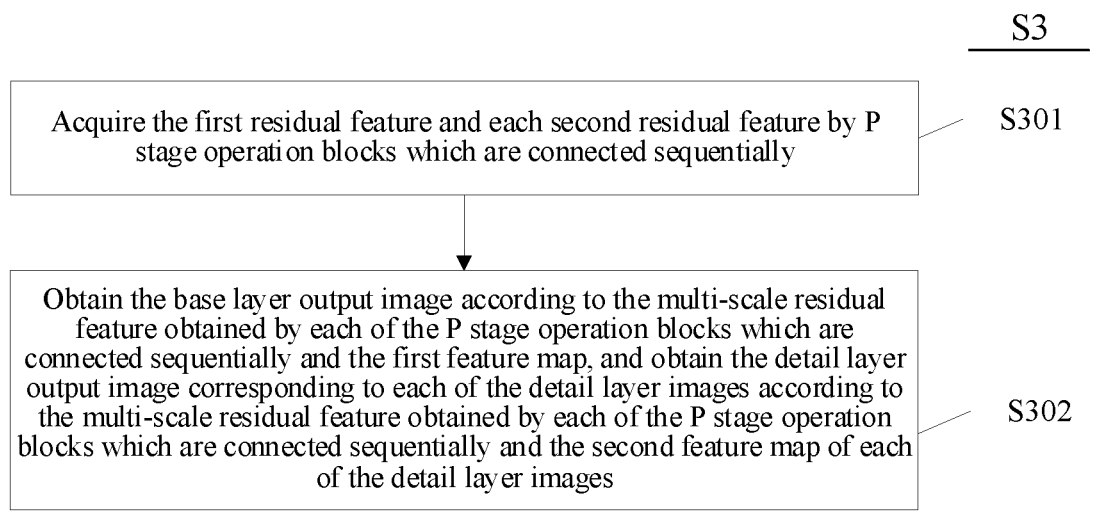
FIG. 2 is a flowchart of a specific implementation method of the act S3 according to the embodiment of the present disclosure.

FIG. 2 is a flowchart of a specific implementation method of the act S3 according to the embodiment of the present disclosure. Specifically, the multi-scale detail enhancement model includes: P stage operation blocks which are connected sequentially; In the act S3, acquiring the first residual feature corresponding to the first feature map and acquiring the second residual feature corresponding to the second feature map of each detail layer image includes act S301; and in the act S3, obtaining the base layer output image according to the first residual feature, each of the second residual features and the first feature map, and for each detail layer image, obtaining the detail layer output image corresponding to the detail layer image according to the first residual feature, each of the second residual features and the second feature map of the detail layer image includes act S302.

At act S301, the first residual feature and each second residual feature are acquired by P stage operation blocks which are connected sequentially.

Herein, P is a positive integer; and the first residual feature correspondingly includes a residual feature extracted by each stage operation block based on the first feature map, and the second residual feature correspondingly includes a residual feature extracted by each stage operation block based on the second feature map.

At act S302, the base layer output image is obtained according to the multi-scale residual feature obtained by each of the P stage operation blocks which are connected sequentially and the first feature map, and the detail layer output image corresponding to each of the detail layer images is obtained according to the multi-scale residual feature obtained by each of the P stage operation blocks which are connected sequentially and the second feature map of each of the detail layer images.

Herein, after extracting residual features based on the first feature map and the second feature map, each operation block superimposes all the extracted residual features to obtain the multi-scale residual feature. Therefore, the base layer output image based on the multi-scale residual features obtained by various operation blocks and the first feature map is obtained, and the detail layer output image based on the multi-scale residual features obtained by various operation blocks and the second feature map is obtained.

Figure 3:
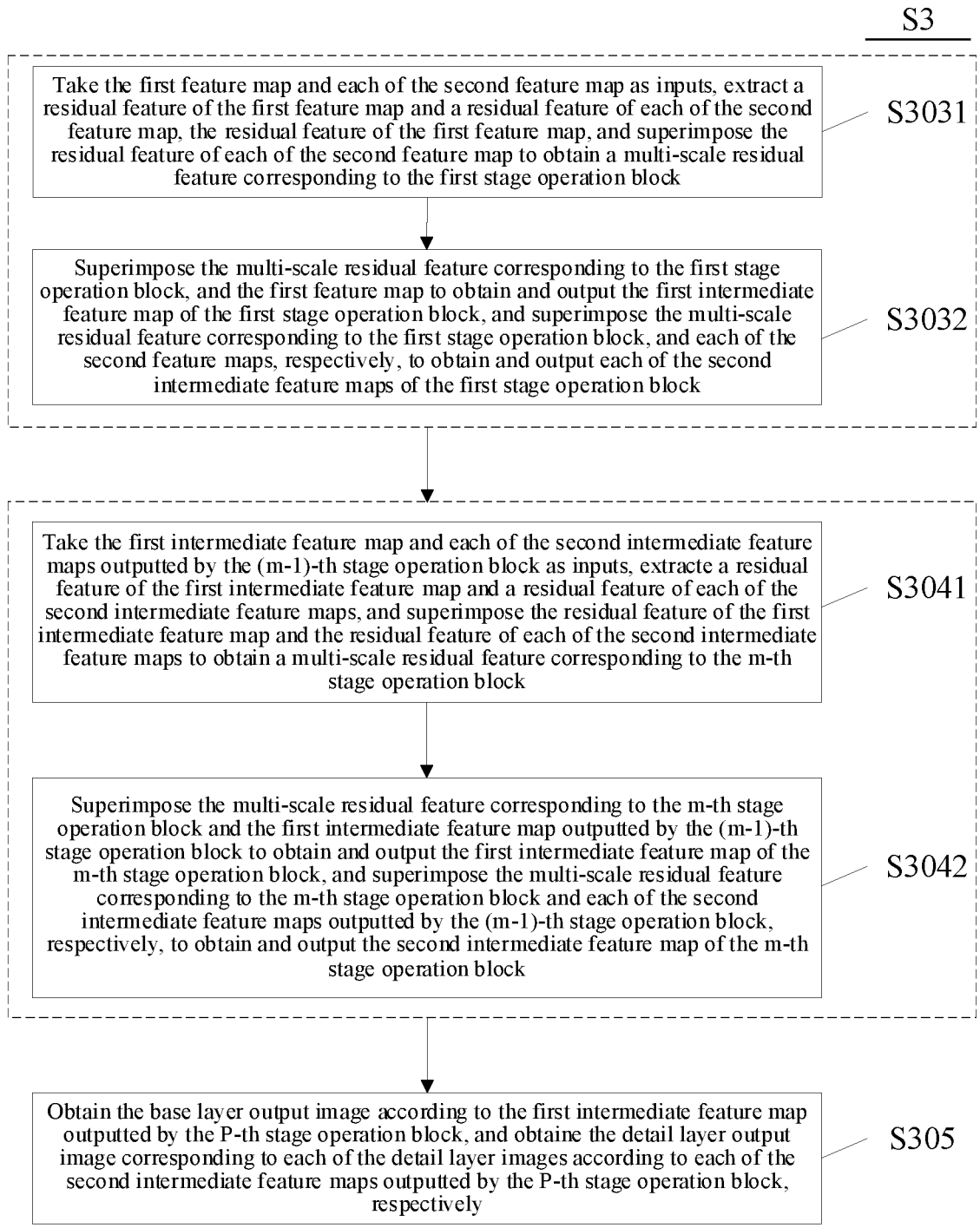
FIG. 3 is a flowchart of another specific implementation method of the act S3 according to an embodiment of the present disclosure.

FIG. 3 is a flowchart of another specific implementation method of the act S3 according to an embodiment of the present disclosure. Specifically, FIG. 3 shows acts performed for each stage operation block of the P stage operation blocks which are connected sequentially on the basis of the act S301 and the act S302 shown in FIG. 2. As shown in FIG. 3, for the first stage operation block, the method includes act S3031 and act S3032; for the m-th stage operation block, the method includes act S3041 and act S3042; and it also includes act S305.

Herein, the act S3031 and the act S3021 are performed based on the first stage operation block.

At the act S3031, the first feature map and each of the second feature maps are taken as inputs, a residual feature of the first feature map and a residual feature of each of the second feature maps are extracted, the residual feature of the first feature map and the residual feature of each of the second feature maps are superimposed to obtain a multi-scale residual feature corresponding to the first stage operation block.

At the act S3032, the multi-scale residual feature corresponding to the first stage operation block, and the first feature map are superimposed to obtain and output the first intermediate feature map of the first stage operation block, and the multi-scale residual feature corresponding to the first stage operation block, and each of the second feature maps are superimposed, respectively, to obtain and output each of the second intermediate feature maps of the first stage operation block.

Herein, the first stage operation block is used to extract and superimpose the residual feature of the first feature map and the residual feature of each of the second feature maps to obtain a corresponding multi-scale residual feature, and then the multi-scale residual feature is superimposed with the first feature map and each of the second feature maps, respectively, to obtain and output a first intermediate feature map and a second intermediate feature map, which may be processed by the next stage operation block.

The act S3031 and the act S3021 are performed based on the m-th stage operation block, wherein m is a positive integer greater than 1 and m is not greater than P.

At act S3041, the first intermediate feature map and each of the second intermediate feature maps outputted by the (m−1)-th stage operation block are taken as inputs, a residual feature of the first intermediate feature map and a residual feature of each of the second intermediate feature maps are extracted, and the residual feature of the first intermediate feature map and the residual feature of each of the second intermediate feature maps are superimposed to obtain a multi-scale residual feature corresponding to the m-th stage operation block.

At act S3042, the multi-scale residual feature corresponding to the m-th stage operation block and the first intermediate feature map outputted by the (m−1)-th stage operation block are superimposed to obtain and output the first intermediate feature map of the m-th stage operation block, and the multi-scale residual feature corresponding to the m-th stage operation block and each of the second intermediate feature maps outputted by the (m−1)-th stage operation block are superimposed, respectively, to obtain and output the second intermediate feature map of the m-th stage operation block.

Herein, similar to the processing procedure of the first stage operation block, the m-th stage operation block extracts and superimposes the residual features of the first intermediate feature map and each of the second intermediate feature maps outputted by the previous stage operation block to obtain the corresponding multi-scale residual feature, and then the multi-scale residual feature is superimposed with the input first intermediate feature map and each of the second intermediate feature maps, respectively, to obtain and output a corresponding first intermediate feature map and a corresponding second intermediate feature map, which may be processed by the next stage operation block or thus generate the base layer output image and the detail layer output image. Correspondingly, the first residual feature corresponding to the first feature map includes the residual feature of the first feature map and a residual feature of each of the first intermediate feature maps, and the second residual feature corresponding to any of the second feature maps includes the residual feature of the second feature map and a residual feature of each of the second intermediate feature maps obtained from the second feature map.

At Act S305, the base layer output image is obtained according to the first intermediate feature map outputted by the P-th stage operation block, and the detail layer output image corresponding to each of the detail layer images is obtained according to each of the second intermediate feature maps outputted by the P-th stage operation block, respectively.

Herein, the base layer output image and the detail layer output image are obtained based on the first intermediate feature map and the second intermediate feature map outputted by the P-th stage operation block (i.e. the last stage operation block); and specifically, the first intermediate feature map and the second intermediate feature map outputted by the last stage operation block are obtained by superimposing residual features based on the initial first feature map and the second feature map by each stage operation block, and the corresponding basic information enhancement and detail information enhancement are correspondingly achieved.

In some embodiments, P is greater than or equal to 2. Specifically, a detail enhancement processing is performed on the base layer image and the detail layer image based on at least two stage operation blocks.

In some embodiments, each stage operation block includes a first operation unit and at least one second operation unit, and the first operation unit and the second operation unit each includes at least two convolution layers; wherein, for the first stage operation block, the first operation unit of the first stage operation block is used to extract the residual feature of the first feature map, and the second operation unit of the first stage operation block is used to extract the residual feature of each second feature map; and for the m-th stage operation block, the first operation unit of the m-th stage operation block is used to extract the residual feature of the first intermediate feature map outputted from the (m−1)th stage operation block, and the second operation unit of the m stage operation block is used to extract the residual feature of each of the second intermediate feature maps outputted from the (m−1)th stage operation block. Specifically, in the first stage operation block, the first operation unit of the first stage operation block corresponds to the first feature map, and the second operation unit of the first stage operation block corresponds to the second feature map one by one; and in the m-th stage operation block, the first operation unit of the m-th stage operation block corresponds to the first intermediate feature map, and the second operation unit of the m-th stage operation block corresponds to the second intermediate feature map one by one.

Figure 4:
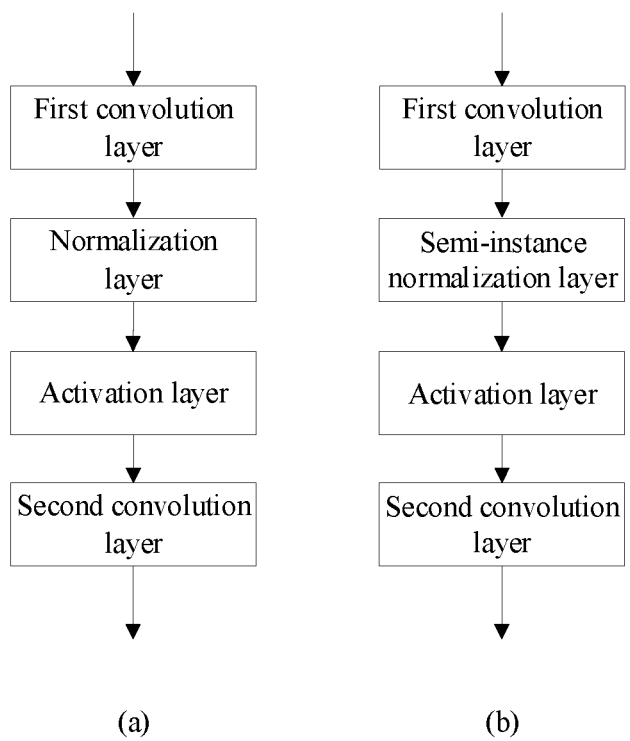
FIG. 4 is a schematic diagram of a structure of an operation unit provided by an embodiment of the present disclosure.

FIG. 4 is a schematic diagram of a structure of an operation unit provided by an embodiment of the present disclosure. As shown in FIG. 4, structures of each layer of the first operation unit and the second operation unit are shown exemplarily based on the following operation unit in which the arrow shows the data transmission direction. Specifically, as can be seen from (a), the operation unit includes a first convolution layer, a normalization layer, an activation layer and a second convolution layer which are connected sequentially.

Herein, a residual feature of the inputted feature map is extracted based on the first convolution layer and the second convolution layer, and the normalization layer and the activation layer are located after the first convolution layer and are used to perform a normalization processing and nonlinear activation processing on the processing result of the first convolution layer; and the first convolution layer and the second convolution layer have the same quantity of output channels, which all employ 3*3 convolution kernels in some embodiments.

Specifically, the term "convolution kernel" in the embodiment of the present disclosure is referred to as a two-dimensional matrix used in the convolution process in correspondence with the operation processing procedures of each layer described above. Alternatively, each of the plurality of items in the two-dimensional matrix has a specific value.

In embodiments of the present disclosure, the term "convolution" is referred to a process of processing an image. The convolution kernel is used for convolution. Each pixel of the image to be processed has a value, and the convolution kernel starts at one pixel of the image to be processed and moves sequentially on each pixel in the image to be processed. At each position of the convolution kernel, the convolution kernel is overlapped with several pixels on the image to be processed based on a scale of the convolution kernel. At the position of the convolution kernel, a value of one of the several overlapping pixels is multiplied by a corresponding value of the convolution kernel to obtain a multiplied value of one of the several overlapping pixels. Subsequently, all the multiplied values of the overlapping pixels are added to obtain a sum corresponding to the position of the convolution kernel on the image to be processed. All the sums corresponding to all the positions of the convolution kernel are collected and outputted by moving the convolution kernel on each pixel of the image to be processed to form a target image. In some embodiments, convolution may use different convolution kernels to extract different features of the image to be processed. In some embodiments, the convolution process may use different convolution kernels to add more features to the image to be processed.

Herein, the convolution layer is used to perform convolution on an image to be processed to obtain an output image. Alternatively, different convolution kernels are used to perform different convolution on the same image to be processed. Alternatively, different convolution kernels are used to perform convolution on different portions of the same image to be processed. Alternatively, different convolution kernels are used to perform convolution on different images to be processed, for example, multiple images are input in a convolution layer, and corresponding convolution kernels are used to perform convolution on images in the plurality of images. Alternatively, different convolution kernels are used according to different situations of the images to be processed.

Herein, the activation layer may perform a nonlinear mapping on the output signal outputted by the convolution layer. Various functions may be used in the activation layer. Examples of functions suitable for use in the activation layer include, but are not limited to, Rectified Linear Unit (ReLU) functions, S-shaped (sigmoid) functions, and hyperbolic tangent functions (e.g. tanh functions). In some embodiments, the activation layer and the normalization layer are included in the convolution layer.

Herein, in the normalization layer (Instance Normalization (IN for short)), a normalization processing may be performed on the output signal outputted from convolution layer, which reduces the computational complexity, accelerates the processing speed and improves the processing effect and performance of the model.

In some embodiments, as seen from (b), the normalization layer is a half instance normalization layer. Specially, the instance normalization processing refers to a normalization processing of a single channel of a single sample, and the half instance normalization layer may be used to perform an instance normalization processing on half channels of the feature map inputted to the layer, while the other half channels remain unchanged. Therefore, the problem of changing parameters such as contrast, color and brightness caused by normalization processing in related technologies may be avoided, and the amount of operation parameters and calculation complexity are reduced based on the general channel for processing, while context information is retained in the half channel without processing, which keeps parameters such as color consistent and improves an effect of the image enhancement.

Figures 5, 6:
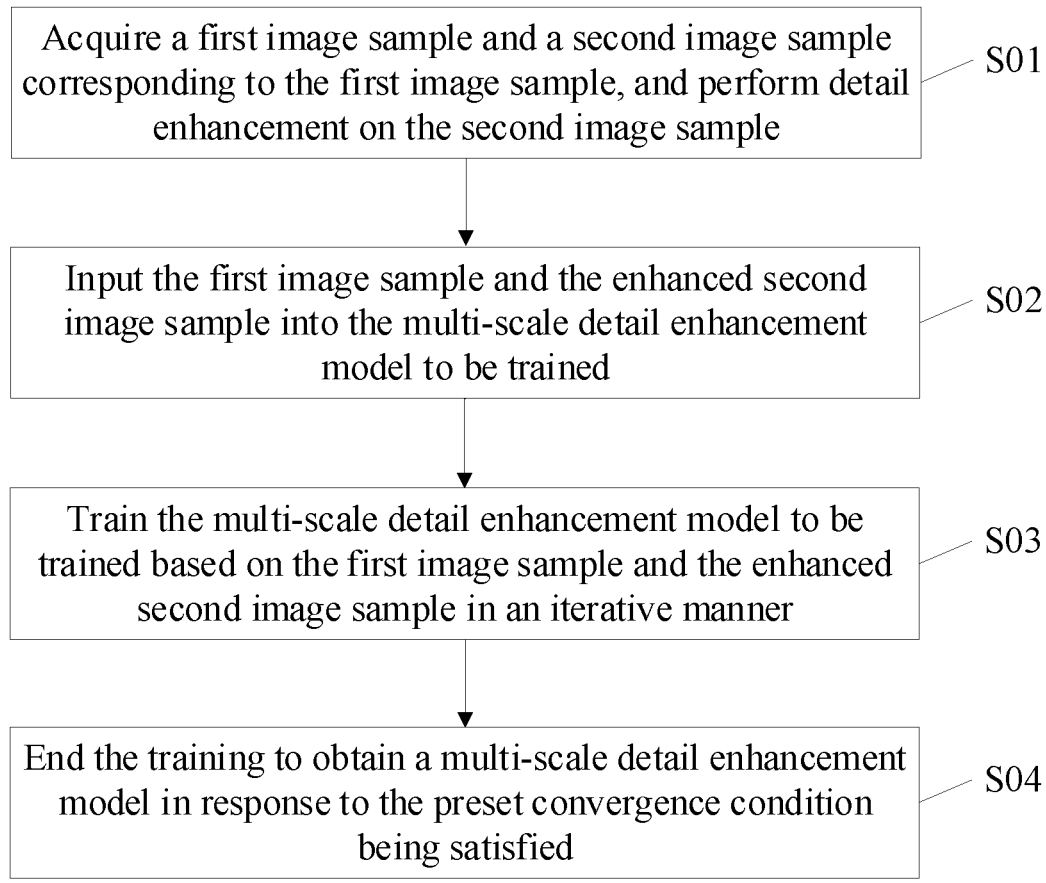
FIG. 5 is a flowchart of a training method of a multi-scale detail enhancement model provided by an embodiment of the present disclosure.
FIG. 6 is a flowchart of a specific implementation method of the act S1 according to the embodiment of the present disclosure.

FIG. 5 is a flowchart of a training method of a multi-scale detail enhancement model provided by an embodiment of the present disclosure. As shown in FIG. 5, the multi-scale detail enhancement model is trained by the following acts.

At act S01, a first image sample and a second image sample corresponding to the first image sample are acquired, and detail enhancement is performed on the second image sample.

In some embodiments, the first image sample and the second image sample are the same image sample.

Alternatively, in some embodiments, the first image sample and the second image sample are noise images and noise-free images corresponding to the same image sample, respectively. Therefore, the multi-scale detail enhancement model obtained by training may be applied for performing a detail processing of images containing noise, and the noise is avoided from being amplified while detail enhancement is achieved.

At act S02, the first image sample and the enhanced second image sample are inputted into the multi-scale detail enhancement model to be trained.

At act S03, the multi-scale detail enhancement model to be trained is trained in an iterative manner based on the first image sample and the enhanced second image sample.

Herein, similar to the reasoning process, in any iteration process, a multi-scale decomposition is performed on the input first image sample based on the multi-scale detail enhancement model to be trained to obtain a base layer image and at least one detail layer image of the first image sample; a first feature map of a base layer image of the first image sample is acquired, and a second feature map of each of the detail layer images of the first image sample is acquired; a first residual feature corresponding to the first feature map is acquired, and a second residual feature corresponding to each of the second feature maps is acquired; a base layer output image of the first image sample is obtained according to the first residual feature, each of the second residual features and the first feature map, and a detail layer output image of the first image sample is obtained according to the first residual feature, each of the second residual features and the second feature map; and the image fusion is performed on the base layer output image and each of the detail layer output images to obtain a first image sample processed by the multi-scale detail enhancement model to be trained.

At act S04, in response to the preset convergence condition being satisfied, the training is ended to obtain a multi-scale detail enhancement model.

In some embodiments, the preset convergence condition includes at least one of the followings: having trained for the preset quantity of iterations; or a loss value satisfying a preset loss value condition, wherein the loss value is obtained by a calculation based on the enhanced second image sample and the first image sample processed by the multi-scale detail enhancement model. In some embodiments, the loss value may be obtained by calculation based on the L1 loss function.

FIG. 6 is a flowchart of a specific implementation of the act S1 according to an embodiment of the present disclosure. As shown in FIG. 6, at act S1, performing a multi-scale decomposition on the input image to obtain a base layer image and at least one detail layer image of the input image includes act S101.

At the act S101, an iterative filtering processing is performed for n times on the input image, wherein n is a positive integer.

Figure 7:
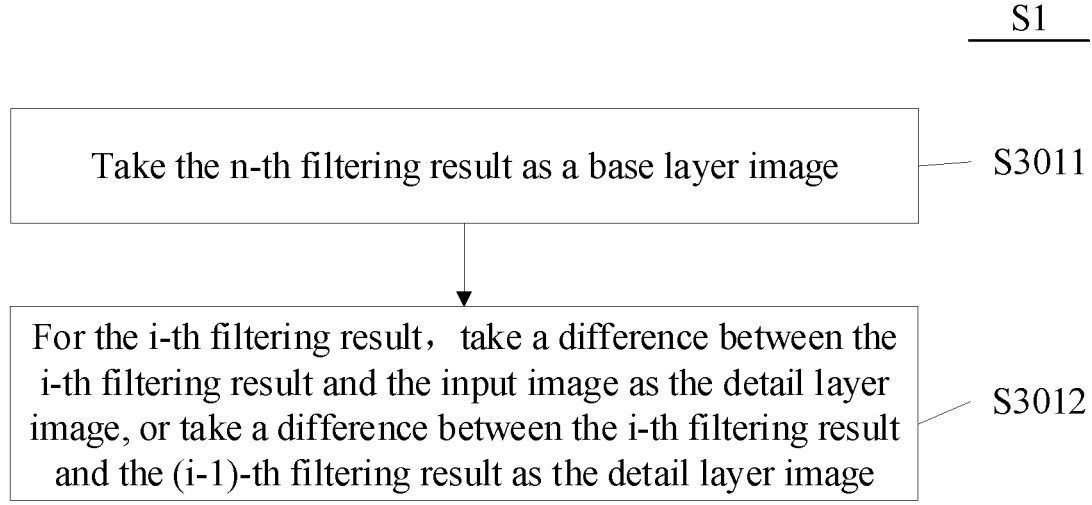
FIG. 7 is a flowchart of another specific implementation method of the act S1 according to an embodiment of the present disclosure.
Figure 8:
FIG. 8 is a flowchart of a specific implementation method of the act S101 according to the embodiment of the present disclosure.

FIG. 7 is a flowchart of another specific implementation of the act S1 according to an embodiment of the present disclosure. Specifically, FIG. 7 shows acts performed for each filtering result of the iterative filtering processing for n times on the basis of act S101 shown in FIG. 1. As shown in FIG. 8, it includes act S1011 and act S1012.

At the act S1011, the n-th filtering result is taken as a base layer image.

At the act S1012, for the i-th filtering result: a difference between the i-th filtering result and the input image is taken as the detail layer image, or a difference between the i-th filtering result and the (i−1)-th filtering result is taken as the detail layer image.

wherein i is a positive integer and i is not greater than n. Specifically, when i is equal to 1, the difference between the first filtering result and the input image is taken as a detail layer image; and for a case that n is greater than 2, when i is greater than or equal to 2, the difference between this filtering result and the previous filtering result is taken as a detail layer image, and thus a plurality of detail layer images may be obtained.

In some embodiments, n is greater than or equal to 2, and accordingly, at least two detail layer images of the input image are obtained to perform a multi-scale detail enhancement on the input image.

In some embodiments, the following formula is adopted:

$$\begin{cases} U_i = f_i(U_{i-1}), & i \in [1, n] \\ D_i = U_{i-1} - U_i \\ B = U_n \end{cases}$$

N iterative filtering processing is performed on the input image $U_0$, and n is a positive integer greater than 1; wherein $U_i$ represents the i-th filtering result; $f_i$ represents a filtering operator, which is an edge preserving filtering operator in some embodiments, $D_i$ represents detail layer images obtained during each filtering, and B represents the base layer image.

FIG. 8 is a flowchart of a specific implementation of the act S101 according to an embodiment of the present disclosure. As shown in FIG. 8, at the act S101, performing an iterative filtering process for n times on the input image includes act S101*a*.

At the act S101*a*, an iterative filtering processing is performed for n times on the input image by using an edge preserving filtering operator.

In some embodiments, any one of a least square iterative filtering processing, a guided filtering processing, a bilateral filtering processing, and a fast bilateral filtering processing is adopted.

Specifically, in the related technology, the filter operator does not have an edge preserving characteristic, and more edge information and detail information will be lost in the filtering result after filtering. Moreover, the edge preserving filtering operator adopted in embodiments of the present disclosure may avoid the phenomena of sawtooth and halo artifacts while detail operations on the base layer image and the detail layer image are performed, and ensure the detail enhancement effect and reduce noise.

The image processing method according to an embodiment of the present disclosure will be described in detail in combination with a practical application.

Figure 9:
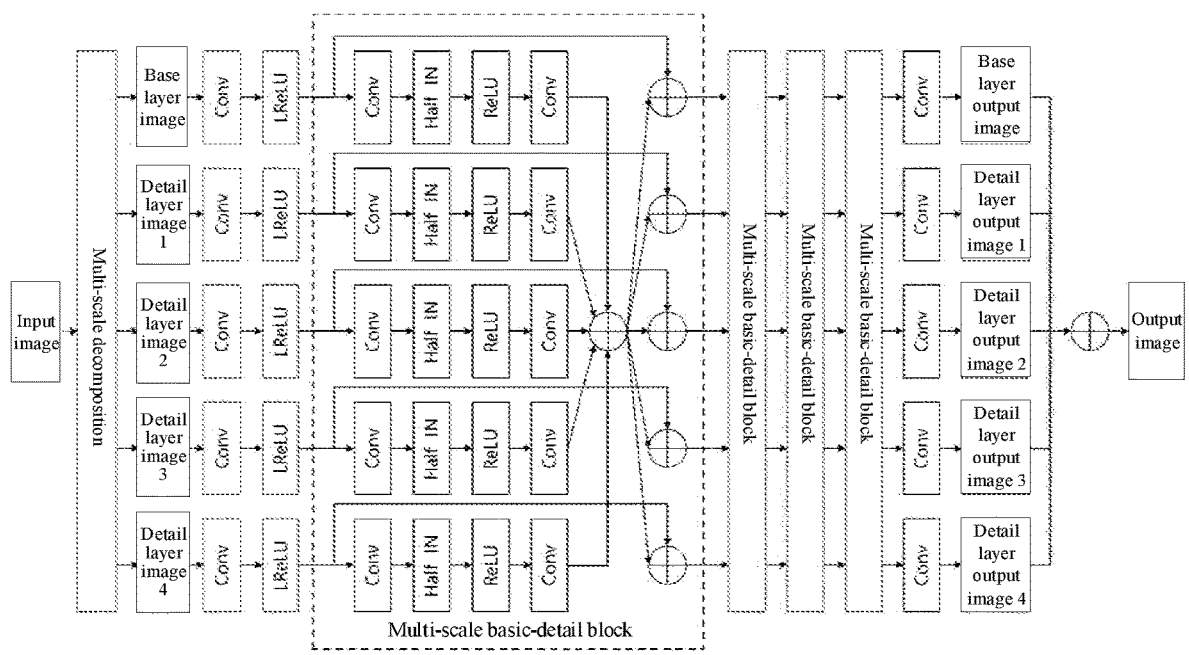
FIG. 9 is a schematic diagram of a structure of a multi-scale detail enhancement model provided by an embodiment of the present disclosure.

FIG. 9 is a schematic diagram of a structure of a multi-scale detail enhancement model provided by an embodiment of the present disclosure. As shown in FIG. 9, the arrow shows the signal transmission direction. Specifically, a multi-scale detail enhancement model is input to the input image, and a base layer image and a detail layer image are obtained after a multi-scale decomposition. FIG. 9 exemplarily shows a case that four detail layer images are obtained by a multi-scale decomposition.

Herein, a filtering processing is performed on the input image for four times based on iterative least square filtering by using the edge preserving filtering operator to obtain a base layer image, a detail layer image 1, a detail layer image 2, a detail layer image 3 and a detail layer image 4 by the multi-scale decomposition. Thereafter, the base layer image, the detail layer image 1, the detail layer image 2, the detail layer image 3 and the detail layer image 4 are extracted by a convolution layer (Conv), and the first feature map corresponding to the base layer image and four second feature maps corresponding to the detail layer images 1 to the detail layer images 4 are obtained after nonlinear processing based on a LeakyReLU function (LReLU) by a first activation layer. The first feature map and four second feature maps are inputted to four stage operation blocks which are connected sequentially, each stage operation block has the same structure and each network layer except for different input and output specific signals. In some embodiments, as shown in FIG. 9, the operation block is also called a multi-scale basic-detail block.

Figure 10:
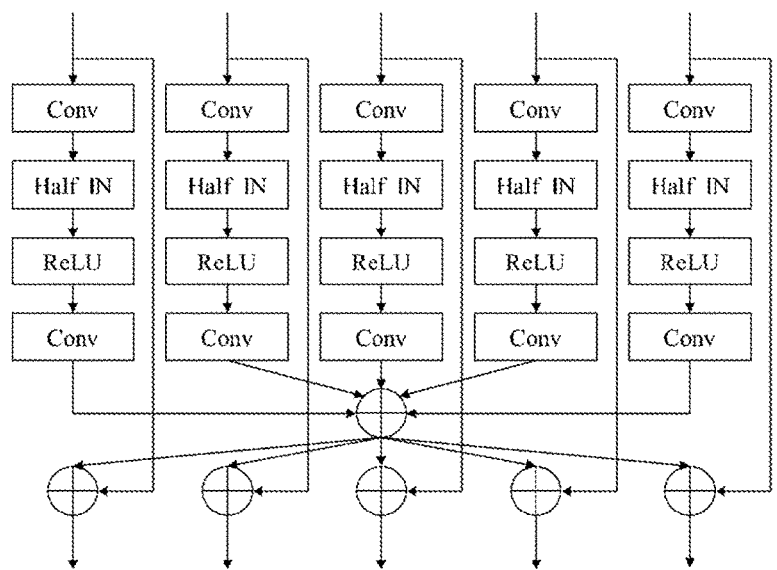
FIG. 10 is a schematic diagram of a structure of an operation block provided by an embodiment of the present disclosure.

FIG. 10 is a schematic diagram of a structure of an operation block provided by an embodiment of the present disclosure. As shown in FIG. 9 and FIG. 10, the operation block includes a first operation unit and a second operation unit corresponding to the first feature map, and in correspondence with the embodiment of FIG. 9, FIG. 10 exemplarily shows a case that four second operation units are included. The first operation unit and each of the second operation units have the same structure and each network layer except for different input and output specific signals. For a single operation unit, it includes a convolution layer (Conv), a half instance normalization layer (Half IN), a second activation layer (ReLU), and a convolution layer (Conv) which are connected sequentially.

Specifically, a respective processing is performed on the input feature maps by the four stage operation blocks which are connected sequentially according to the following flow. For the first stage operation block, the first feature map and each of the second feature maps taken as inputs, the first operation unit of the first stage operation block is used to extract a residual feature of the first feature map, the second operation unit of the first stage operation block is used to extract a residual feature of each of the second feature maps, the residual feature of the first feature map and the residual feature of each of the second feature maps are superimposed to obtain a multi-scale residual feature corresponding to the first stage operation block, the multi-scale residual feature and the first feature map are superimposed to obtain and output a first intermediate feature map of the first stage operation block, and the multi-scale residual feature and the second feature map are superimposed to obtain and output a second intermediate feature map of the first stage operation block; and for the m-th stage operation block, wherein m=(2, 3, 4), the first intermediate feature map and each of the second intermediate feature maps outputted from the previous stage operation block of the m-th stage operation block are taken as inputs, the first operation unit of the m-th stage operation block is used to extract a residual feature of the first intermediate feature map outputted from the previous stage operation block of the m-th stage operation block, the second operation unit of the m-th stage operation block is used to extract a residual feature of each of the second intermediate feature maps outputted from the previous stage operation block of the m-th stage operation block, all the extracted residual feature are superimposed to obtain a multi-scale residual feature corresponding to the stage operation block, the multi-scale residual feature and the first intermediate feature map outputted from the previous stage operation block are superimposed to obtain and output the first intermediate feature map of the stage operation block, and the multi-scale residual feature and each of the second intermediate feature maps outputted from the previous stage operation block are superimposed to obtain and output the second intermediate feature map of the stage operation block; and the first intermediate feature map and each of the second intermediate feature maps outputted from the fourth stage operation block are inputted to a convolution layer (Conv) for reconstruction, and thus, the corresponding base layer output image, the detail layer output images 1, the detail layer output images 2, the detail layer output images 3 and detail layer output images 4 are obtained. Finally, the image fusion is performed on the base layer output image and the four detail layers output images to obtain the output image, and the detail enhancement of the input image is completed.

Figure 11:
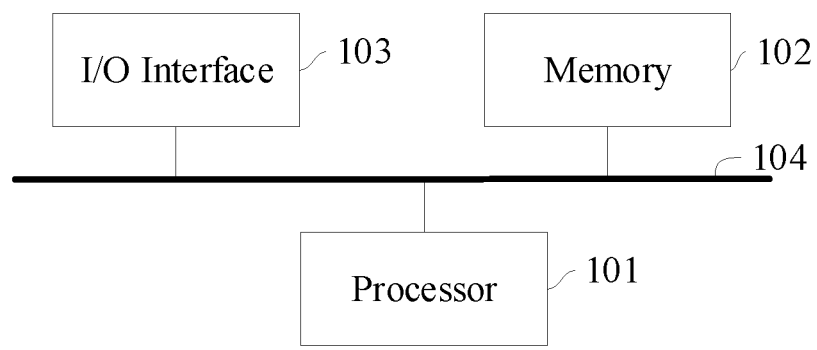
FIG. 11 is a block diagram of a composition of an electronic device provided by an embodiment of the present disclosure.

FIG. 11 is a block diagram of a composition of an electronic device provided by an embodiment of the present disclosure. As shown in FIG. 11, the electronic device includes:

one or more processors 101;

memory 102 having one or more programs stored thereon, when the one or more programs are executed by the one or more processors, an image processing method as in any of the above embodiments is implemented by the one or more processors 101;

one or more I/O interfaces 103, connected between the processor and the memory, configured to enable information interaction between the processor and the memory.

Herein, the processor 101 is a device with data processing capability, including but not limited to a central processing unit (CPU), etc.; the memory 102 is a device with data storage capability, including but not limited to a random access memory (RAM, more specifically SDRAM, DDR, etc.), a read only memory (ROM), an electrically erasable programmable read only memory (EEPROM), flash memory (FLASH); the I/O interface (read-write interface) 103 is connected between the processor 101 and the memory 102, and can achieve information interaction between the processor 101 and the memory 102, including but not limited to a data bus (Bus) and the like.

In some embodiments, the processor 101, the memory 102 and the I/O Interface 103 are connected to each other via the bus 104 and thereby to other components of a computing device.

In some embodiments, a plurality of processors 101 includes a plurality of Graphics Processing Units (GPUs) which are arranged in combination to form a graphics processor array.

Figure 12:
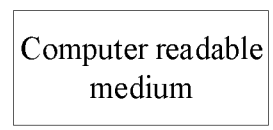
FIG. 12 is a block diagram of a composition of a non-transient computer readable medium provided by an embodiment of the present disclosure.

FIG. 12 is a block diagram of a composition of a non-transient computer readable medium provided by an embodiment of the present disclosure. A computer program is stored on the computer-readable storage medium, wherein, when executed by a processor, an image processing method as in any of the above embodiments is implemented by the computer program.

It may be understood by those ordinary skilled in the art that all or some acts in a method and function modules/units in an apparatus disclosed above may be implemented as software, firmware, hardware, and appropriate combinations thereof. In a hardware implementation mode, division between functional modules/units mentioned in the above description does not necessarily correspond to division of physical components. For example, a physical component may have multiple functions, or a function or an act may be performed by several physical components in cooperation. Some physical components or all physical components may be implemented as software executed by a processor such as a central processing unit, a digital signal processor or a microprocessor, or implemented as hardware, or implemented as an integrated circuit such as an application specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer-readable instruction, a data structure, a program module, or other data). The computer storage medium includes, but is not limited to, a RAM, a ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be used for storing desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

Exemplary embodiments have been disclosed herein, and although specific terms are employed, they are only used and should only be interpreted in a general illustrative sense, and are not used for the purpose of limitation. In some examples, it is obvious to those skilled in the art that the features, characteristics and/or elements described in connection with specific embodiments may be used alone or in combination with those described in connection with other embodiments, unless explicitly stated otherwise. Therefore, it will be understood by those skilled in the art that various changes in form and details may be made without departing from the scope of the present disclosure as set forth in the appended claims.

The invention claimed is:

1. An image processing method, comprising:
performing detail enhancement on an input image to be processed to obtain an output image by using a trained multi-scale detail enhancement model;
wherein the multi-scale detail enhancement model is configured to perform following acts:
performing a multi-scale decomposition on the input image to obtain a base layer image and at least one detail layer image of the input image;
acquiring a first feature map of the base layer image and acquiring a second feature map of each of the at least one detail layer image;
acquiring a first residual feature corresponding to the first feature map, and acquiring a second residual feature corresponding to the second feature map of each of the at least one detail layer image; obtaining a base layer output image according to the first residual feature, each of at least one second residual feature, and the first feature map, and
for each of the at least one detail layer image, obtaining a detail layer output image corresponding to each of the at least one detail layer image according to the first residual feature, each of the at least one second residual feature and the second feature map of the each of the at least one detail layer image; and
performing an image fusion on the base layer output image and each of detail layer output images to obtain the output image,
wherein the acquiring the first residual feature corresponding to the first feature map and acquiring the second residual feature corresponding to the second feature map of each of the at least one detail layer image comprises:
acquiring the first residual feature and each of the at least one second residual feature through P stage operation blocks which are connected sequentially, wherein P is a positive integer;
wherein, for a first stage operation block, taking the first feature map and each of at least one second feature map as inputs, extracting a residual feature of the first feature map and a residual feature of each of the at least one second feature map, superimposing the residual feature of the first feature map and the residual feature of each of the at least one second feature map to obtain a multi-scale residual feature corresponding to the first stage operation block;
for a m-th stage operation block, wherein m is a positive integer greater than 1 and m is not greater than P, taking a first intermediate feature map and each of at least one second intermediate feature map outputted by a (m−1)-th stage operation block as inputs, extracting a residual feature of the first intermediate feature map and a residual feature of each of the at least one second intermediate feature map, superimposing the residual feature of the first intermediate feature map and the residual feature of each of the at least one second intermediate feature map to obtain a multi-scale residual feature corresponding to the m-th stage operation block;

the obtaining a base layer output image according to the first residual feature, each of the at least one second residual feature and the first feature map, and for each of the at least one detail layer image, obtaining a detail layer output image corresponding to each of the at least one detail layer image according to the first residual feature, each of the at least one second residual feature and the second feature map of the each of the at least one detail layer image comprises:

obtaining the base layer output image according to the multi-scale residual feature obtained by each of the P stage operation blocks which are connected sequentially and the first feature map, and obtaining the detail layer output image corresponding to each of the at least one detail layer image according to the multi-scale residual feature obtained by each of the P stage operation blocks which are connected sequentially and the second feature map of each of the at least one detail layer image;

wherein, for the first stage operation block, superimposing the multi-scale residual feature corresponding to the first stage operation block and the first feature map to obtain and output the first intermediate feature map of the first stage operation block, and superimposing the multi-scale residual feature corresponding to the first stage operation block and each of the at least one second feature map, respectively, to obtain and output each of the at least one second intermediate feature map of the first stage operation block;

for the m-th stage operation block, superimposing the multi-scale residual feature corresponding to the m-th stage operation block and the first intermediate feature map outputted by the (m−1)-th stage operation block to obtain and output the first intermediate feature map of the m-th stage operation block, and superimposing the multi-scale residual feature corresponding to the m-th stage operation block and each of the at least one second intermediate feature map outputted by the (m−1)-th stage operation block, respectively, to obtain and output each of the at least one second intermediate feature map of the m-th stage operation block; and obtaining the base layer output image according to the first intermediate feature map outputted by the P-th stage operation block, and obtaining the detail layer output image corresponding to each of the at least one detail layer image according to each of the at least one second intermediate feature map outputted by the P-th stage operation block, respectively.

2. The image processing method according to claim 1, wherein each stage operation block comprises a first operation unit and at least one second operation unit, and the first operation unit and the second operation unit each comprises at least two convolution layers;

wherein, for the first stage operation block, a residual feature of the first feature map is extracted by using the first operation unit of the first stage operation block, and a residual feature of each of the second feature maps is extracted by using the second operation unit of the first stage operation block; and for the m-th stage operation block, a residual feature of the first intermediate feature map outputted by the (m−1)-th stage operation block is extracted by using the first operation unit of the m-th stage operation block, and a residual feature of each of the second intermediate feature maps outputted by the (m−1)th stage operation block is extracted by using the second operation unit of the m-th stage operation block.

3. The image processing method according to claim 2, wherein both the first operation unit and the second operation unit comprise a first convolution layer, a normalization layer, an activation layer, and a second convolution layer which are connected sequentially.

4. The image processing method according to claim 3, wherein the normalization layer is a half instance normalization layer.

5. The image processing method according to claim 1, wherein the multi-scale detail enhancement model is trained by following acts:

acquiring a first image sample and a second image sample corresponding to the first image sample, and performing the detail enhancement on the second image sample;

inputting the first image sample and the enhanced second image sample into the multi-scale detail enhancement model to be trained;

training the multi-scale detail enhancement model in an iteration manner based on the first image sample and the enhanced second image sample; and ending the training to obtain the multi-scale detail enhancement model in response to a preset convergence condition being satisfied.

6. The image processing method according to claim 5, wherein the preset convergence condition comprises at least one of following:

having trained for a preset quantity of iterations; or a loss value satisfying a preset loss value condition, wherein the loss value is obtained by a calculation based on the enhanced second image sample and the first image sample processed by the multi-scale detail enhancement model.

7. The image processing method according to claim 5, wherein the first image sample and the second image sample are noise-free images and noise images corresponding to a same image sample, respectively.

8. The image processing method according to claim 1, wherein the performing the multi-scale decomposition on the input image to obtain the base layer image and at least one detail layer image of the input image comprises:

performing an iterative filtering processing for n times on the input image, wherein n is a positive integer;

wherein a n-th filtering result is taken as the base layer image; and for an i-th filtering result, wherein i is a positive integer and i is not greater than n, taking a difference between the i-th filtering result and the input image as the detail layer image, or taking a difference between the i-th filtering result and a (i-1)-th filtering result as the detail layer image.

9. The image processing method according to claim 8, wherein the performing an iterative filtering processing for n times on the input image comprises:

performing an iterative filtering processing for n times on the input image by using a edge preserving filtering operator.

10. The image processing method according to claim 8, wherein n is greater than or equal to 2.

11. An electronic device, comprising:

one or more processors;

a memory for storing one or more programs; and when the one or more programs are executed by the one or more processors, the one or more processors implementing the image processing method according to claim 1.

12. A non-transitory computer-readable medium, having a computer program stored thereon, wherein when the computer program is executed, the image processing method according to claim 1 is implemented.

\* \* \* \* \*